United States Patent [19]
Dent et al.

[11] Patent Number: 6,122,500
[45] Date of Patent: Sep. 19, 2000

[54] CORDLESS TIME-DUPLEX PHONE WITH IMPROVED HEARING-AID COMPATIBLE MODE

[75] Inventors: Paul Wilkinson Dent, Pittsboro; Anders Torstensson, Cary, both of N.C.

[73] Assignee: Ericsson, Inc., Research Triangle Park, N.C.

[21] Appl. No.: 08/590,891

[22] Filed: Jan. 24, 1996

[51] Int. Cl.[7] .............................. H04Q 7/20; H04Q 7/32
[52] U.S. Cl. .................. 455/414; 455/450; 455/512; 455/552; 455/553; 455/403; 370/318; 381/23.1
[58] Field of Search ................... 455/414, 450, 455/522, 512, 552, 553, 38.3, 403; 379/52, 410; 370/329, 468, 336, 337, 347, 458, 341, 442, 348, 318; 381/23.1

[56] References Cited

U.S. PATENT DOCUMENTS

| | | | |
|---|---|---|---|
| 5,267,262 | 11/1993 | Wheatley, III | 455/522 |
| 5,371,780 | 12/1994 | Amitay | 455/512 |
| 5,485,486 | 1/1996 | Gilhousen et al. | 455/522 |
| 5,530,700 | 6/1996 | Tran et al. | 370/341 |
| 5,539,806 | 7/1996 | Allen et al. | 379/52 |
| 5,570,411 | 10/1996 | Sicher | 455/450 |
| 5,596,625 | 1/1997 | LeBlanc | 455/404 |
| 5,621,763 | 4/1997 | Walczak | 375/312 |
| 5,642,378 | 6/1997 | Denheyer et al. | 455/553 |
| 5,666,654 | 9/1997 | Kanai | 455/522 |
| 5,675,611 | 10/1997 | Lehtinen et al. | 375/297 |
| 5,710,762 | 1/1998 | Petranovich | 370/280 |
| 5,737,389 | 4/1998 | Allen | 379/410 |
| 5,809,017 | 9/1998 | Smith et al. | 370/318 |

FOREIGN PATENT DOCUMENTS

| | | |
|---|---|---|
| 632609 | 1/1995 | European Pat. Off. . |
| 685972 | 12/1995 | European Pat. Off. . |
| 688109 | 12/1995 | European Pat. Off. . |
| 2238449 | 5/1991 | United Kingdom . |

OTHER PUBLICATIONS

International Search Report re PCT/US97/00711 Date of mailing of search report: Jul. 4, 1997.

Funkschau, "*Brummen im Ohr–GSM–Handys und Hörgeräte*" vol. 67, No. 25, pp. 60–61 (Nov. 24, 1995).

*Primary Examiner*—Lee Nguyen
*Assistant Examiner*—Keith Ferguson
*Attorney, Agent, or Firm*—Burns, Doane, Swecker & Mathis, L.L.P.

[57] ABSTRACT

Techniques for providing a hearing aid compatible mode of transmission for a mobile station in a radio communication system are described. By adjusting a transmission envelope of a mobile station which transmits information in a burst fashion, harmonics which would normally be introduced into a hearing aid placed in close proximity with the mobile station are avoided. The modified transmission envelope provides a more gradual up and down-ramping of power to the transmitter to avoid introducing harmonics in the audio frequencies. This service can be provided at a system level in a manner which will avoid unnecessarily reducing system capacity by, for example, authenticating a user's identity, his or her subscription to this mode of operation, the mobile station's ability to modify the transmission envelope according to the present invention, and the user's desire to actually implement the hearing aid compatible mode of operation.

12 Claims, 4 Drawing Sheets

CORDLESS TIME-DUPLEX PHONE WITH IMPROVED HEARING-AID COMPATIBLE MODE

BACKGROUND

The present invention provides, for example, a method to reduce hum in a hearing aid due to RF electromagnetic compatibility (EMC) effects when a hearing aid wearer uses a cordless (e.g., cellular) phone employing intermittent transmission.

Conventional radiocommunication systems provide examples of three different types of radio transmission protocol for use by cellular or cordless phones. The earlier deployed systems, such as the U.S. AMPS system, the British TACS system and the Scandinavian NMT system, employ continuous analog FM transmission of speech, and each conversation is allocated a different channel. This technique is known as Frequency Division Multiple Access or FDMA.

More recently, digitally coded speech has been employed in systems such as the European GSM system, the U.S. IS-54 system and the Japanese PDC system, because it affords better protection against fading in the mobile radio propagation environment, higher system capacity, longer battery life and privacy through digital encryption. These systems employ Time Division Multiple Access (TDMA) techniques whereby a single radio frequency channel is shared between several calls by allocating different timeslots to different calls. Additionally, the transmit and receive timeslots in these TDMA systems are staggered so that the phone does not have to transmit and receive simultaneously. This feature is advantageous in eliminating the large, expensive and lossy duplexing filters that were used with the earlier continuous analog transmission systems that required simultaneous transmission and reception. Moreover, time duplex is essential when the frequency band allocated for a system does not allow an adequate frequency spacing between transmit and receive, as-in the so-called U.S. "part 15, unlicensed bands", the bands used for the European digital cordless phone standard known as DECT, and in the 1900 MHz PCS bands just released in the USA.

In time duplex operation, the transmitter is inactive for a certain period during each frame, which period is at least long enough to receive a signal burst. The loss of transmission time caused by this inactive period is made up by buffering the digitized speech signal to be transmitted in a memory and subsequently transmitting the buffered signal at a higher rate than that at which it was buffered during its allocated slot. The peak transmitter power is increased by the same factor to support the higher rate, maintaining the same (or lower) mean power. When such a phone is operated near sound reproducing equipment that is not designed for operation in close proximity to radio transmitters, such as hearing aids or high-fi equipment, the transmitter pulse repetition rate can be spuriously detected in the equipment giving rise to an audible buzz. This effect only occurs when the cordless phone is extremely close to such equipment, for example, within three feet or less, which is the case when a phone is placed next to the hearing aid of a hearing impaired subscriber.

A third access method that has been proposed is Code Division Multiple Access (CDMA). CDMA systems may employ continuous transmission but still permit many conversations to take place using the same spectrum, as the differently coded signals can overlap without interference providing their relative power levels are not too divergent. A disadvantage of CDMA phones is their lack of retrospective compatibility with earlier standards, an important factor in introducing new systems, or the larger size and higher cost of providing a dual mode phone with retrospective compatibility. CDMA systems (such as that described in the US IS-95 standard) are also risky precisely because of their need for very strict power control since one errant phone that incorrectly controls its power can jam the whole system. A touted potential advantage of CDMA systems generally is that the phone transmits a lower power continuously instead of using higher power bursts, however the U.S. IS-95 system employs burst transmission of varying duty factor in the phone and thus does not offer much improved hearing aid compatibility.

Hybrid time duplex CDMA systems have been developed to overcome the disadvantages of IS-95, such as the Omnipoint wideband CDMA system developed for use in the so-called "unlicensed" bands that do not have a frequency duplex spacing. Time-duplex CDMA phones also employ intermittent or burst transmission and so require a method to improve compatibility with the use of hearing aids.

Since the above-mentioned TDMA systems account for over 99% of the current world market, it is important to provide phones which also include an operating mode of improved hearing aid compatibility so that hearing aid wearers are not subjected to the above-described annoying hum or buzz.

SUMMARY

Cordless handheld telephones employing time-duplex transmission are known which advantageously do not require simultaneous transmission and reception, allowing costs to be reduced and giving longer battery life. The transmitter normally operates for a short time slot in a repetitive frame period to transmit speech to a base station alternating with the receiver operating in a different short time slot in the repetitive frame period to receive speech from the base station. Other telephone calls may be supported simultaneously using the same radio channel by assigning different transmit and different receive slots to different phones.

When a cordless phone is used by a hearing aid wearer, the phone comes in close proximity to the hearing aid and, in particular, the cordless phone's transmit antenna is only inches from the hearing aid, potentially giving rise to hum due to the hearing aid spuriously detecting the transmitter's RF pulse repetition frequency. Phones according to the present invention include both the normal mode of operation and a new mode of operation which can be invoked by hearing aid wearers when the service provider has issued a proper authorization with the subscription. The subscription offered to hearing aid users can also include other features useful to the hearing impaired such as text message services.

In the hearing aid compatible mode, phones according to exemplary embodiments of the present invention adopt a sinusoidal transmission amplitude envelope in which annoying high harmonic frequencies of the transmission pulse are suppressed. This technique causes a user's transmission to occupy a larger proportion of the repetitive frame period than that used in the normal mode of operation, thereby reducing the number of users that can be accommodated on the channel. However, if only authorized hearing aid users are eligible to transmit in the new mode, the loss of capacity to the system overall will be negligible. The present invention provides an improved pulse shaping for intermittent transmitters using any access methodology, e.g., TDMA, CDMA or time-duplex CDMA, to eliminate pulse harmonics that cause the buzzing anomaly in sound reproducing equipment mentioned above.

BRIEF DESCRIPTION OF THE DRAWINGS

The foregoing, and other, objects, features and advantages of the present invention will become more apparent upon reading the following detailed description in conjunction with the drawings in which.

DETAILED DESCRIPTION

Figure 1:
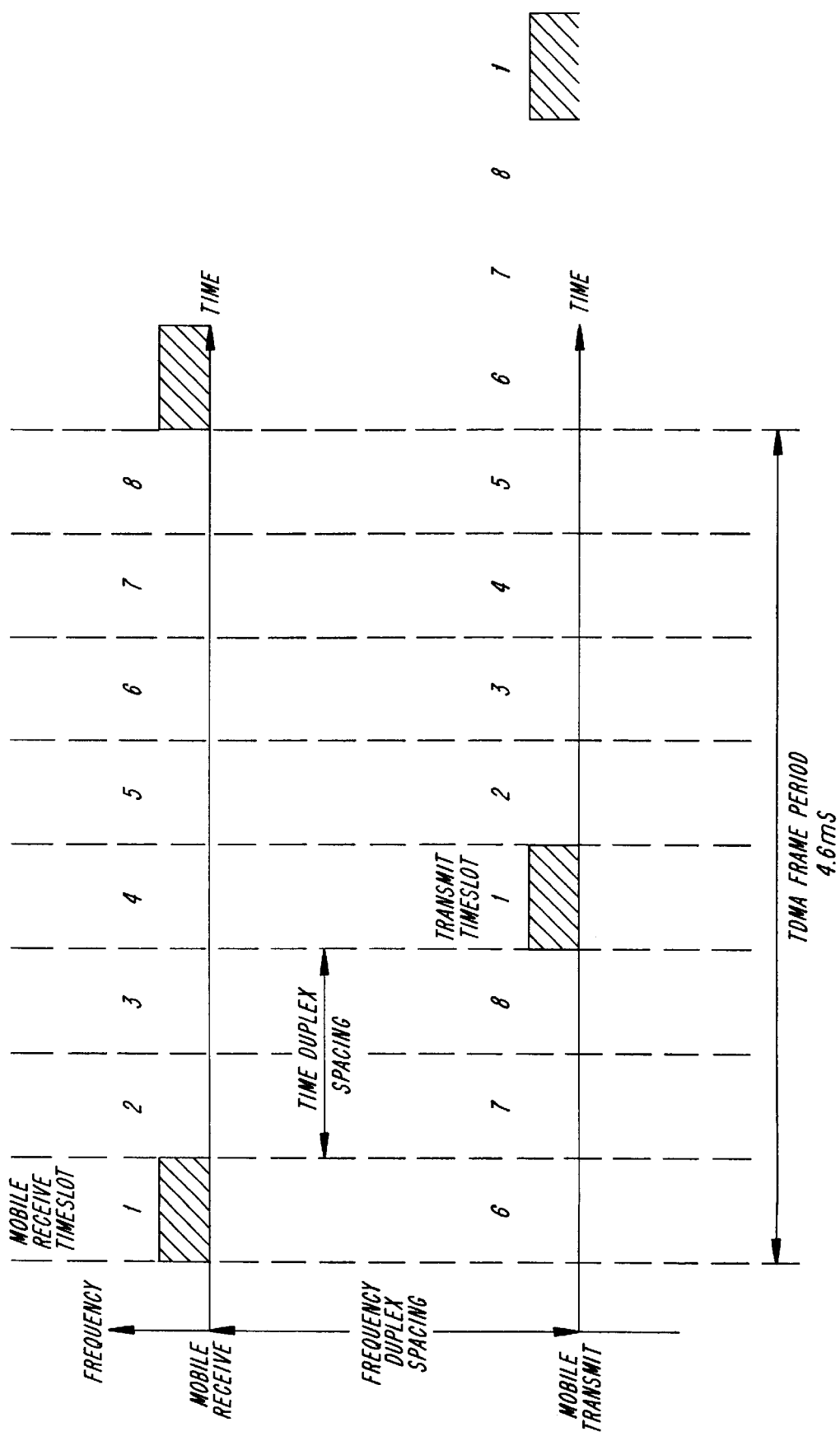
FIG. 1 illustrates an example of the transmission format used in the GSM system, which format is used as an example to describe the present invention.

FIG. 1 shows an example of the transmission format employed in the TDMA cellular system known as Global System for Mobile Communications (GSM). Therein, a repetitive frame period of approximately 4.6 ms is divided into eight timeslots (or 16 timeslots in the half-rate mode). Mobiles receive on a radio channel in a receive frequency band, each mobile receiving in an allocated one of the eight timeslots, e.g., timeslot 1 in FIG. 1. The mobile also transmits on a channel in the transmit frequency band in an allocated transmit timeslot, e.g., timeslot 1. Transmit timeslots are staggered in time relative to their corresponding receive timeslots so that the mobile phone does not have to transmit and receive at the same time. This is illustrated in the example of FIG. 1 as the time duplex spacing of two timeslots between timeslot 1 on the mobile receive frequency and timeslot 1 on the mobile transmit frequency. When different transmit and receive bands are employed, the base station may receive and transmit in all timeslots, and thus support eight conversations in the same transmit/receive channel pair. Otherwise, if no frequency-duplex spacing is employed, the base station can, for example, use four of the timeslots for transmission and four for reception, thus supporting four conversations in a single transmit/receive channel. In GSM, the remainder of the time not used by a particular mobile for transmission and reception is available for the mobile's receiver to scan other channels in order to determine, for example, when it should request a handover to a stronger base station. This process is known as mobile-assisted handover.

The transmit pulse formats are defined by the GSM specifications and include a guard time between pulses, an up/down-ramping time to turn the transmitter power smoothly on and off to avoid spectral splatter into unsynchronized adjacent channels, some guard bits at each end of the burst, and the main body of the TDMA burst which transmits 114 data bits, 26 sync bits and two control bits at a flat power level. The up/down-ramping times are adequate to prevent spectral spreading into an adjacent channel 200 KHz away, but are not designed to control harmonics of the 220 Hz pulse repetition rate in the audio band of 300 Hz to 4 KHz. Absent the special transmission mode described below, these harmonics cause audible noises in a hearing impaired user's hearing aid.

Figure 2:
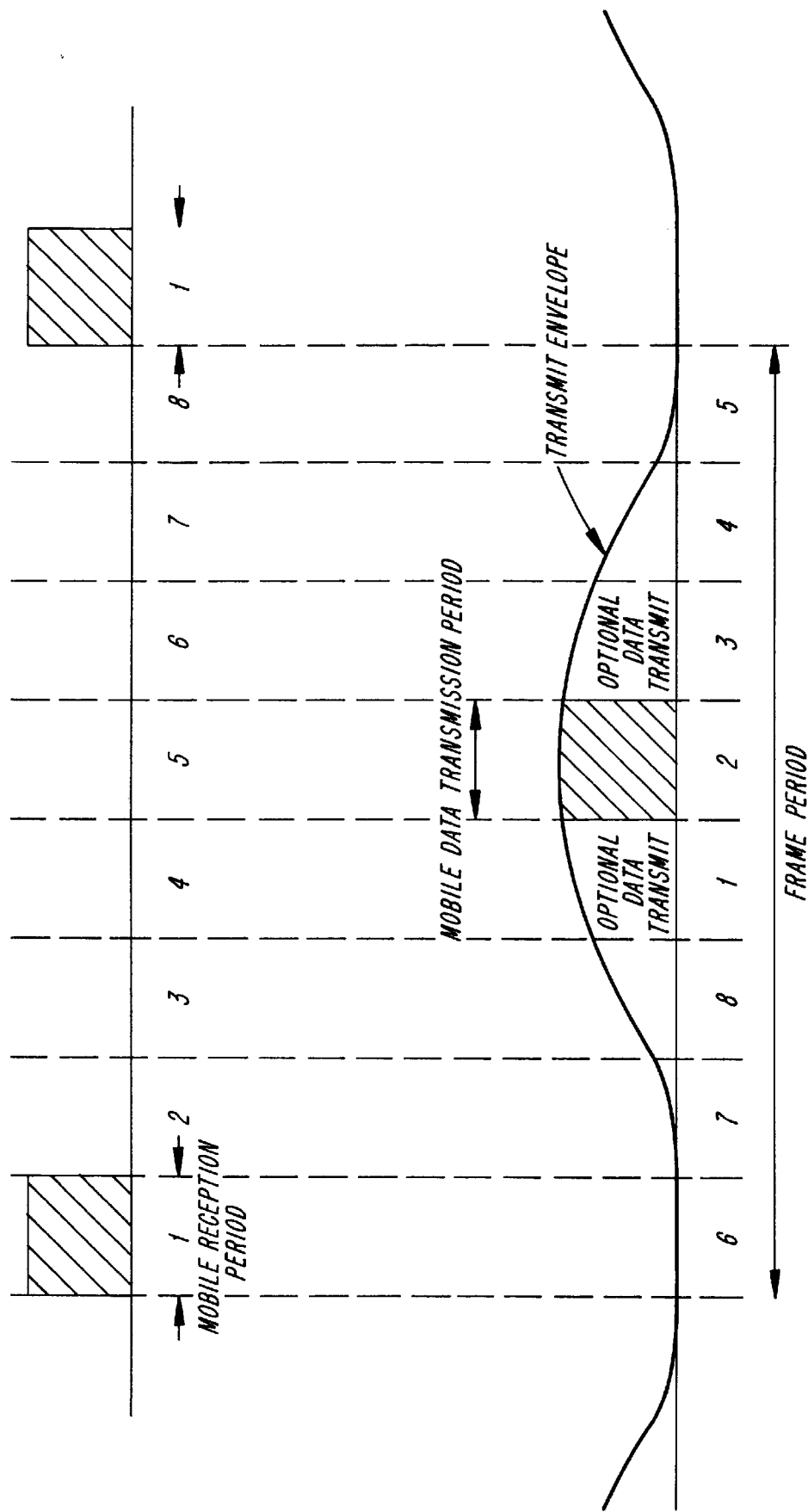
FIG. 2 illustrates an exemplary transmission format for the GSM system modified according to the present invention.

FIG. 2 shows an exemplary modified GSM reception and transmission format designed to control harmonics of the frame frequency. The receive slots are the same as those illustrated in FIG. 1, but the transmit slot timing has been centered midway between receive slots. This permits a relatively slow, almost sinusoidal, up and down-ramping of the transmitter power. The central part of the peak (e.g., transmit timeslot 2) can be used for transmitting a normal burst format, e.g., comprising the above-described data and sync bits. Optionally, one or more of the slots on either side of the center slot may be used to repeat transmission of the data, allowing a special base station receiver to utilize the extra energy to improve signal quality and potentially allow the peak power to be reduced. In this exemplary embodiment, the transmitter power is held to zero or very low for approximately one timeslot (e.g., 0.56 ms) after the end of reception (e.g., transmit slot 7 in FIG. 2) and before the start of the next receive burst (e.g., transmit timeslot 5), to allow settling time for frequency synthesizer frequency changes between transmit and receive, so that the transmitter is not generating RF energy until the frequency is at least within the allotted 200 KHz channel.

Using the exemplary format illustrated in FIG. 2, there are essentially three slots per frame of more or less total transmitter silence in which other mobile transmitters can be received interference free. Thus in total, the capacity is reduced by a factor of two, for the fraction of a percent of cases where a hearing impaired user needs to employ the inventive mode. The impact on system capacity is therefore virtually negligible if use is restricted to authorized subscribers. Having described an exemplary mobile transmission mode for hearing-impaired subscribers, an exemplary system level implementation will now be described.

Figure 3:
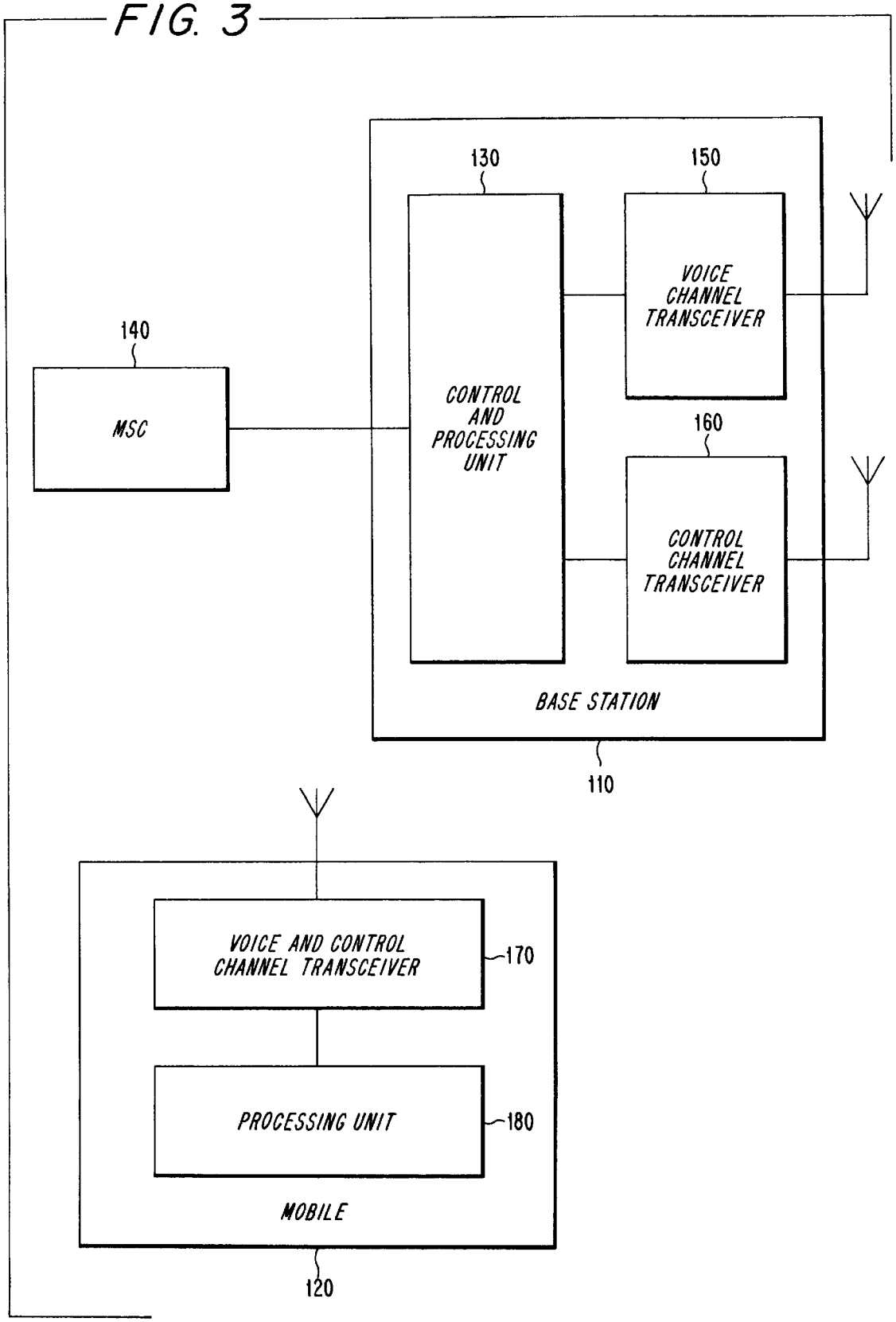
FIG. 3 is a block diagram illustrating an exemplary system according to the present invention.

FIG. 3 represents a block diagram of an exemplary cellular mobile radiotelephone system according to one embodiment of the present invention which can be used to implement the foregoing. The system shows an exemplary base station 110 and a mobile 120. The base station includes a control and processing unit 130 which is connected to the MSC 140 which in turn is connected to the public switched telephone network (not shown).

The base station 110 for a cell includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel.

When the mobile 120 first enters the idle mode, it periodically scans the control channels of base stations like base station 110 to determine which cell to lock to on or camp on. The mobile 120 receives the absolute and relative information broadcast on a control channel at its voice and control channel transceiver 170. Then, the processing unit 180 evaluates the received control channel information which includes the characteristics of the candidate cells and determines which cell the mobile should lock to. The received control channel information not only includes absolute information concerning the cell with which it is associated, but also contains relative information concerning other cells proximate to the cell with which the control channel is associated. These adjacent cells are periodically scanned while monitoring the primary control channel to determine if there is a more suitable candidate. Analogously, this equipment can be used to perform the MAHO techniques described previously while the mobile 120 is connected to the system. Additional information relating to specifics of mobile and base station implementations can be found in copending U.S. patent application Ser. No. 07/967,027 entitled "Multi-Mode Signal Processing" filed on Oct. 27, 1992 to P. Dent and B. Ekelund, which disclosure is incorporated here by reference.

In the context of the present invention, processing unit 180 of mobile 120 controls the tuning and power used by the transceiver 170. Thus, when operating in a normal mode, processing unit 180 will control transceiver 170 in, for example, the manner illustrated in FIG. 1. When, on the other hand, operating in a hearing impaired mode, processing unit 180 will more gradually rampup and rampdown the power used in transceiver 170. Although one exemplary power profile is illustrated in FIG. 2, those skilled in the art will appreciate that the more general concept of the present invention, i.e., the gradual ramping of power up and down for burst transmissions in a second operational mode, need not occupy five timeslots as illustrated in FIG. 2. Depending upon the transmission format and system in which the present application is applied, and the system designers desire to accommodate hearing impaired users while also not impairing capacity should the number of hearing impaired users be relatively large, e.g., in a specific micro-cell environment, the number of timeslots over which a single burst can be power tapered may be more or fewer than five. As a more general formulation, it is sufficient to say that power ramping according to the present invention will simply occupy more than one timeslot in a TDMA type format.

The GSM system includes a cipher-protected authentication system to verify the identity of users. This is embodied in a plug-in smart card (not shown) disposed in the mobile unit which contains a subscriber-specific secret key known only to the service-provider's computer and stored in the Home Location Register (HLR). When a mobile phone accesses a network station, the network station verifies the identity of the user as determined by the installed smart card by contacting the HLR and obtaining a set of three security numbers. The first number is a random challenge which is sent to the mobile station and passed to the installed smart card. The smart card combines the challenge with the secret key and outputs a response dependent on both. Part of the response is sent by the mobile station to the network station, where the network station compares it with the second security number received from the HLR. If the response matches the second number, then the mobile station is verified to have a valid smart card installed which contains the secret key issued only to that subscriber. The other part of the smart card's response is used as a cipher key for encrypting the rest of the call, and corresponds to the third security number sent from the HLR to the network station. Only if this cipher key also matches can communication actually take place. The GSM authentication and cipher system thus guarantee the identity of the subscriber. The HLR can then also access other subscriber-related information such as whether international calls are permitted or not, whether the hearing-impaired mode is authorized or not, and so-on.

Figure 4:
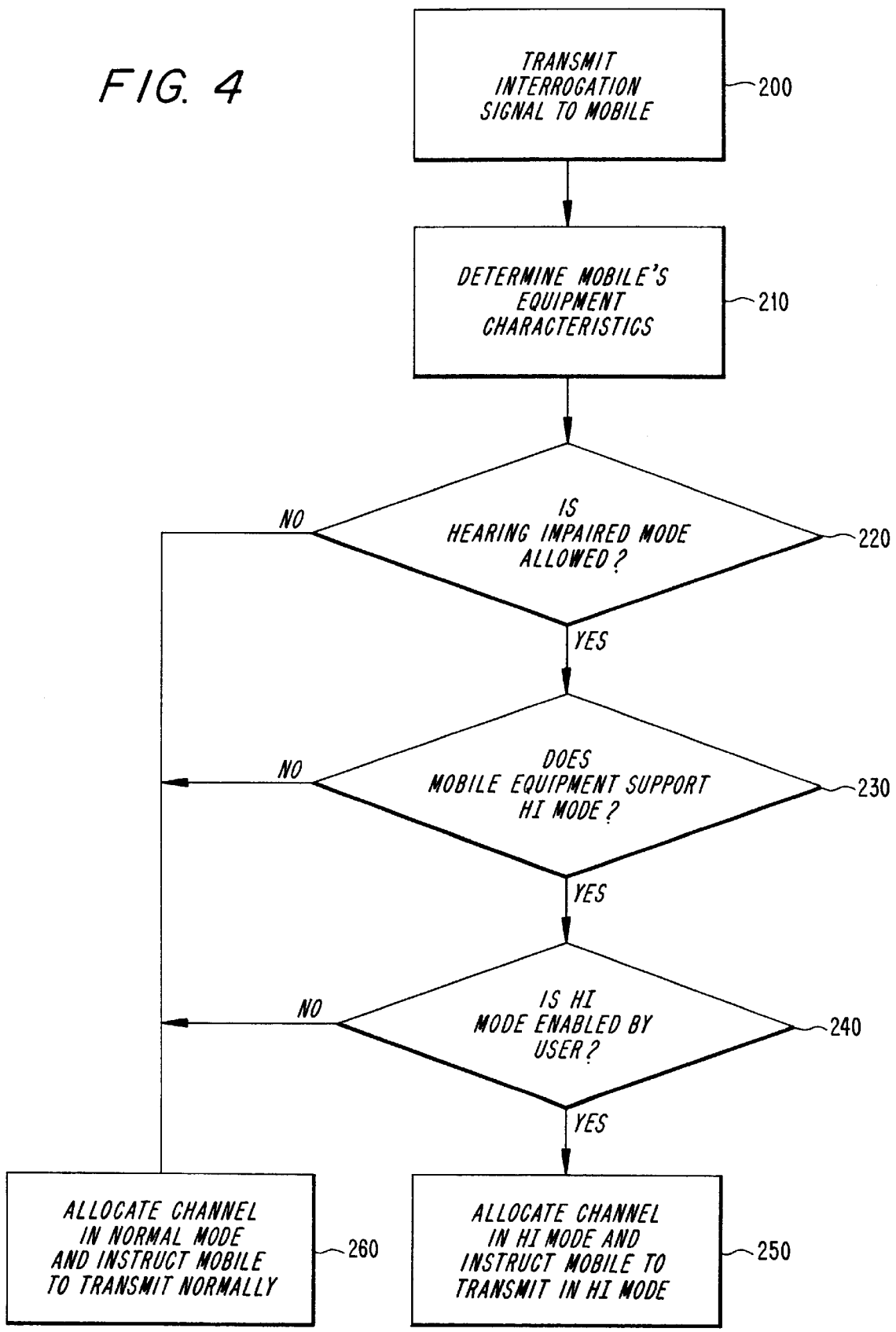
FIG. 4 is a flowchart used to illustrate an exemplary method according to the present invention.

With reference to the flowchart of FIG. 4, the network station can also request the mobile phone to transmit its electronic serial number by transmitting an interrogation signal thereto at block 200. A data base of electronic serial numbers may be maintained by the network to look-up characteristics of each equipment, such as whether the hearing-impaired mode is supported by the equipment. There are also "class-bits" stored in the mobile which can be used to indicate the type of equipment to the network. In either case, the system determines the mobile's capabilities as indicated by block 210. Additionally, the user can program the phone from the keyboard and display to enable the hearing impaired mode automatically whenever a call is placed or received, or selectively as desired. This information can be transmitted to the network at, for example, registration. The network can check all three types of information, namely:

(i) that the hearing impaired mode is an allowed mode in the subscriber profile (in which case it can be offered cost free) at block 220;

(ii) that the phone currently in use supports the hearing impaired (HI) mode (block 230), and (iii) that the user has enabled the hearing impaired mode (block 240).

According to the exemplary embodiment illustrated in FIG. 4, all three conditions should be satisfied in order for the hearing impaired mode, e.g., the transmission format of FIG. 2, to be allocated by, for example, setting an indicating bit in the channel-allocation message at call set up at block 250. If one of these conditions is not met, then the flow proceeds to block 260 where normal mobile transmission (e.g., FIG. 1) is performed by, for example, not setting the indicating bit.

Alternatively, if a user does not have the hearing impaired mode enabled in his or her subscriber profile this user can still receive the mode upon request if the equipment supports it, but the operator may then charge a premium (for example, double airtime costs) for the extra system capacity consumed. This extra charge can be waived, at the operator's discretion, for hearing impaired users that register to use the mode.

A method has been described for improving hearing aid compatibility in digital cellular phone systems. Other solutions that improve service to the hearing impaired may, like the solution described above, consume more system capacity when employed thus reducing operator revenues. For example, in a system such as IS-95, the varying duty factor used to reduce average system loading consumed by one telephone call may be omitted to improve hearing aid compatibility. In a TDMA system, it is possible to conceive of allocating all timeslots to one user if a frequency duplexer is used, thus eliminating on-off transmitter switching. The reduction in system capacity and revenue is however insignificant when use is restricted to the small, genuine hearing impaired community however, which is guaranteed by the automatic authentication aspect of the invention. Any such system as may be devised or modified by persons skilled in the art making use of the above principles is deemed to fall within the scope of this invention as described by the following claims.

What is claimed is:

1. In a cellular telephone network including a network of base stations for communicating with a plurality of mobile stations, a method of providing service to a hearing impaired user comprising the following steps:

transmitting an interrogation signal from the network to a mobile station and receiving a response verifying an identity of said hearing impaired user; and allocating a higher proportion of system communications throughput resources if requested by the user and if a profile contained in a network database for said identified user permits such allocation by allocating one or more additional timeslots to the mobile station's transmitter.

2. The method of claim 1 further comprising the step of reducing a peak power associated with said mobile station's transmitter in relation to the one or more additional timeslots allocated.

3. The method of claim 1 in which said mobile transmitter employs said additional timeslots to extend power up- and down-ramping time to reduce audio frequency harmonics of a pulse repetition rate associated with said mobile station's transmitter.

4. The method of claim 3 in which said power up- and down-ramping is an approximately sinusoidal amplitude modulation.

5. In a cellular telephone network including a network of base stations for communicating with a plurality of mobile stations, a method of providing service to a hearing impaired user comprising the following steps:

transmitting an interrogation signal from the network to a mobile station and receiving a response verifying an identity of said hearing impaired user; and allocating a higher proportion of system communications throughput resources if requested by the user and if a profile contained in a network database for said identified user permits such allocation by allowing said mobile station to increase its average transmit duty factor.

6. The method of claim 5 further comprising the step of reducing a peak power associated with said mobile station's transmitter in relation to the increase in average transmit duty factor.

7. In a cellular telephone network including a network of base stations for communicating with a plurality of mobile telephones, a method of improving service to a hearing impaired user comprising the following steps;

transmitting an interrogation signal from the network to a mobile station to determine capabilities of said mobile station and verify a user identity;

receiving a response from the mobile station authenticating the user identity, indicating the capabilities of said mobile station and including a request for special user features; and allocating a hearing aid compatible communications channel if indicated by said special user request and if said requested feature is supported by said indicated capabilities.

8. The method of claim 7 in which said step of allocating further comprises the step of:

allocating said hearing aid compatible channel only if said identified user is registered as authorized to receive said hearing aid compatible channel.

9. The method of claim 7 in which said step of allocating further comprises the step of:

allocating said hearing aid compatible channel with no additional airtime cost being accumulated by a network billing system if said identified user has previously registered to receive said hearing aid compatible channel.

10. A mobile station comprising:

a transceiver for transmitting bursts of information at controllable power levels; and a processor for controlling power levels associated with said bursts according to one of a first mode and a second mode;

wherein said first mode is a normal operating mode and said second mode is a hearing aid compatibles operating mode; and wherein said transceiver an indicating bit at call set-up and said processor controls said transceiver in accordance with one of said first and second modes based upon a value of said indicating bit.

11. The mobile station of claim 10 wherein said processor adjusts said power levels in said second mode at a rate which is substatially more gradual than a rate associated with said first mode.

12. The mobile station of claim 10 wherein said processor adjusts said power levels in said second mode to mitigate harmonics which can be induced in a hearing aid by said mobile station.

* * * * *

UNITED STATES PATENT AND TRADEMARK OFFICE
CERTIFICATE OF CORRECTION

PATENT NO. : 6,122,500
DATED : September 19, 2000
INVENTOR(S) : Paul W. DENT et al.

It is hereby certified that error appears in the above-identified patent and that said Letters Patent is hereby corrected as shown below:

Column 8, line 26, after "transceiver", please insert --receives--.

Signed and Sealed this

First Day of May, 2001

Attest:

NICHOLAS P. GODICI

*Attesting Officer*   *Acting Director of the United States Patent and Trademark Office*